US007520042B2

(12) United States Patent
Ingram (10) Patent No.: US 7,520,042 B2
(45) Date of Patent: *Apr. 21, 2009

(54) FLEXIBLE CONNECTORS AND METHODS OF MANUFACTURING SAME (75) Inventor: Thomas L. Ingram, Keller, TX (US)

(73) Assignee: Flex-Ing, Inc., Sherman, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/609,398

(22) Filed: Dec. 12, 2006

(65) Prior Publication Data

US 2007/0079495 A1 Apr. 12, 2007

Related U.S. Application Data (60) Continuation-in-part of application No. 11/266,421, filed on Nov. 3, 2005, which is a continuation of application No. 11/041,401, filed on Jan. 24, 2005, now Pat. No. 7,063,358, which is a division of application No. 10/736,416, filed on Dec. 15, 2003, now Pat. No. 6,922,893, which is a continuation-in-part of application No. 10/689,279, filed on Oct. 20, 2003, now Pat. No. 7,140,648.

(51) Int. Cl.
*B21D 39/00* (2006.01)
*B21D 53/00* (2006.01)
*B23P 19/04* (2006.01)
*F16L 13/14* (2006.01)
*F16L 27/00* (2006.01)
*F16L 33/00* (2006.01)

(52) U.S. Cl. .............................. 29/518; 29/237; 29/508; 29/516; 29/520; 29/890.144; 285/256; 285/272; 285/382; 285/382.1; 285/382.7

(58) Field of Classification Search ................... 29/237, 29/508, 516, 518, 520, 890.144; 285/256, 285/272, 382, 382.1, 382.7
See application file for complete search history.

(56) References Cited

U.S. PATENT DOCUMENTS

| | | | | |
|---|---|---|---|---|
| 1,969,203 | A | 8/1934 | Cadden et al. | 285/222.2 |
| 2,172,532 | A | 9/1939 | Fentress | |
| 2,216,468 | A | 10/1940 | Farrar | |
| 2,357,669 | A | 9/1944 | Lake | 285/222.5 |
| 2,363,586 | A | 11/1944 | Guarnaschelli | 285/222.5 |
| 2,556,544 | A | 6/1951 | Johnson | 285/222.5 |
| 2,583,956 | A * | 1/1952 | Monroe et al. | 285/222.5 |
| 2,848,254 | A | 8/1958 | Millar | |
| 2,987,329 | A | 6/1961 | Barton | 285/222.5 |
| 3,023,496 | A | 3/1962 | Humphrey | 228/182 |
| 3,565,116 | A | 2/1971 | Gabin | 138/109 |
| 4,141,576 | A | 2/1979 | Lupke et al. | 285/369 |

(Continued)

*Primary Examiner*—David P Bryant
*Assistant Examiner*—Alexander P Taousakis
(74) *Attorney, Agent, or Firm*—Michael A. O'Neil (57) ABSTRACT

An end piece for a flexible connector comprises a sleeve defining the proximal end thereof. A length of corrugated tubing is extended into the sleeve and the sleeve is crimped thereby joining the length of corrugated tubing to the end piece. For high pressure applications a length of polymeric tubing, a length of mesh tubing, and an outer sleeve are positioned in a surrounding relationship to the sleeve of the end piece and the outer sleeve is crimped thereby securing the length of mesh tubing to the end piece.

7 Claims, 10 Drawing Sheets

U.S. PATENT DOCUMENTS

| | | | |
|---|---|---|---|
| 4,232,712 A | 11/1980 | Squires | 138/109 |
| 4,578,855 A | 4/1986 | Van Der Hagen | 29/447 |
| 4,693,501 A | 9/1987 | Logsdon, Jr. et al. | 285/173 |
| 5,069,253 A | 12/1991 | Hadley | 138/109 |
| 5,209,267 A | 5/1993 | Morin | 138/109 |
| 5,233,739 A | 8/1993 | Holden et al. | 29/237 |
| 5,335,945 A | 8/1994 | Meyers | 285/236 |
| 5,430,929 A | 7/1995 | Samders | 29/507 |
| 5,511,720 A | 4/1996 | Zaborszki et al. | 228/136 |
| 5,529,098 A | 6/1996 | Bravo | 141/88 |
| 5,769,463 A | 6/1998 | Thomas | 285/49 |
| 5,803,511 A | 9/1998 | Bessette | 285/222.5 |
| 5,894,865 A | 4/1999 | Winter et al. | 138/121 |
| 6,021,818 A | 2/2000 | Horst et al. | 138/172 |
| 6,092,274 A | 7/2000 | Foti | 29/520 |
| 6,378,914 B1 * | 4/2002 | Quaranta | 285/256 |
| 6,866,302 B2 | 3/2005 | Furata | 285/256 |
| 6,922,893 B2 | 8/2005 | Ingram | 29/890.144 |
| 7,014,216 B2 | 3/2006 | Mittersteiner et al. | 285/247 |
| 7,017,949 B2 | 3/2006 | Luft et al. | 285/256 |
| 2003/0197372 A1 | 10/2003 | Hoff et al. | 285/256 |
| 2006/0049628 A1 | 3/2006 | Ingram | 285/256 |

* cited by examiner

FLEXIBLE CONNECTORS AND METHODS OF MANUFACTURING SAME

CROSS-REFERENCE TO RELATED APPLICATIONS

This application is a continuation-in-part application of application Ser. No. 11/266,421 filed Nov. 3, 2005, currently pending, the entire contents of which are incorporated herein by reference; which is a continuation application of application Ser. No. 11/041,401 filed Jan. 24, 2005, now U.S. Pat. No. 7,063,358, the entire contents of which are incorporated herein by reference; which is a divisional application of application Ser. No. 10/736,416 filed Dec. 15, 2003, now U.S. Pat. No. 6,922,893, the entire contents of which are incorporated herein by reference; which is a continuation-in-part application of application Ser. No. 10/689,279 filed Oct. 20, 2003, now U.S. Pat. No. 7,140,648, the entire contents of which are incorporated herein by reference.

TECHNICAL FIELD

This invention relates generally to flexible connectors of the type utilized in conjunction with fire hoses and in similar applications, and more particularly to flexible connectors which are less expensive to manufacture as compared with the prior art.

BACKGROUND AND SUMMARY OF THE INVENTION

Figure 1A:
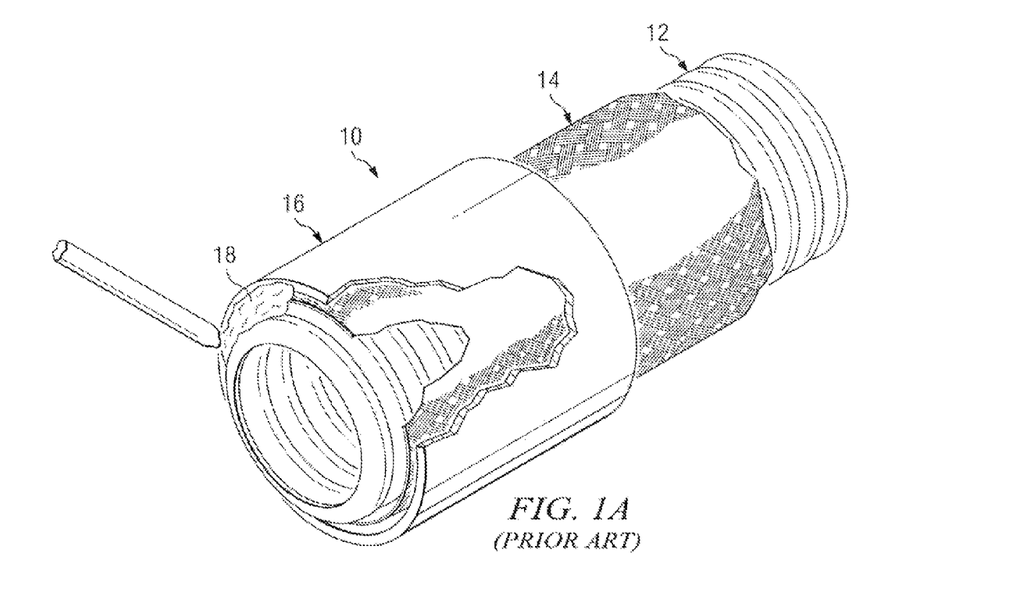
FIG. 1A is a perspective view illustrating a prior art flexible connector.
Figure 1B:
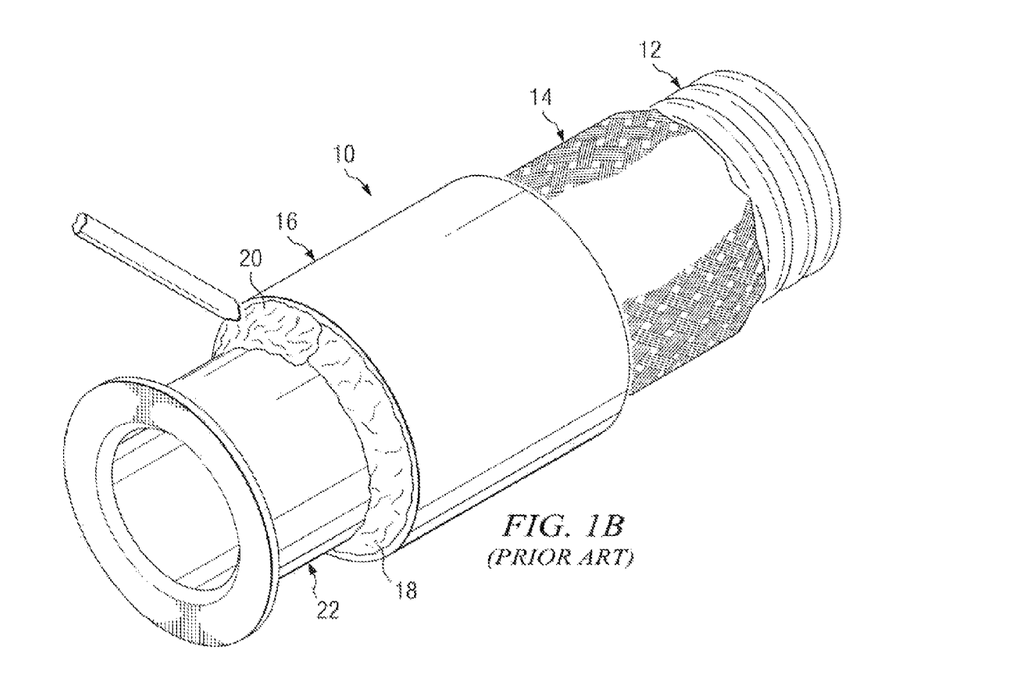
FIG. 1B is a perspective view further illustrating the prior art flexible connector of FIG. 1A.

Referring to FIGS. 1A and 1B, there is shown a typical prior art flexible connector 10. The flexible connector 10 includes a corrugated tube 12. The function of the corrugated tube 12 is to contain fluids passing through the flexible connector 10 while affording flexibility thereto. The corrugated tube 12 does not have sufficient bursting strength to withstand the high pressures often associated with typical flexible connector applications.

Therefore, the flexible connector 10 may also include a mesh tube 14 which surrounds the corrugated tube 12. The function of the mesh tube 14 is to provide the necessary bursting strength without compromising the flexibility of the corrugated tube 12. As is known to those skilled in the art, the mesh tube 14 can be omitted in low pressure applications.

The tubes 12 and 14 extend the entire length of the flexible connector 10. At each end thereof there is provided a sleeve 16. The function of the sleeve 16 is to facilitate manipulation of the flexible connector 10 both during connection thereof to other instrumentalities and during use.

FIGS. 1A and 1B also illustrate the construction of the flexible connector 10. First, the corrugated tube 12, the mesh tube 14, and the sleeve 16 are assembled as shown in FIG. 1A, that is, with the ends thereof substantially aligned. Thereafter, a weldment 18 is formed around the ends of the corrugated tube 12, the mesh tube 14, and the sleeve 16. The weldment 18 secures all three components one to another. Of course, in applications in which the mesh tube 14 is omitted, only the corrugated tube 12 and the sleeve 16 are secured by the weldment 18.

Following the welding step shown in FIG. 1A, a weldment 20 is employed to secure an end piece 22 at each end of the flexible connector 10. As will be appreciated by those skilled in the art, the end piece 22 shown in FIG. 2A is representative only. In actual practice numerous types and kinds of end pieces are utilized in the construction of flexible connectors.

As will therefore be understood, the construction of a prior art flexible connector requires two welding steps both of which must be precisely executed in order that the flexible connector will be properly constructed. The type of welding required to properly assemble a flexible connector of the kind shown in FIGS. 1A and 1B requires the services of highly skilled technicians having years of experience. It will therefore be understood that the type of flexible connector shown in FIGS. 1A and 1B and described hereinabove is relatively expensive to manufacture.

The present invention comprises improvements in flexible connector design and construction which overcome the foregoing and other difficulties which have long since characterized the prior art. In accordance with the broader aspects of the invention, a flexible connector includes a corrugated tube and an end piece. The proximal end of the end piece and the distal end of the corrugated tube are engaged with one another. A length of polymeric tubing is then extended over the adjacent ends of the corrugated tubing and the end piece, thereby retaining the ends of the length of corrugated tube and of the end piece in engagement with one another.

The length of polymeric tubing may be received within a length of mesh tubing which extends the entire length of the corrugated tube and also extends over the proximal end of the end piece. A sleeve having an axial length approximating the axial length of the polymeric tubing is then extended over the end of the mesh tube. The sleeve is then crimped thereby completing the manufacture of the flexible connector.

In low pressure applications, the length of mesh tubing may be omitted. In such instances the sleeve extends over the length of polymeric tubing. Following the positioning of the stainless steel sleeve in alignment with the length of polymeric tubing and with the engaged ends of the corrugated tube and the end piece, the sleeve is crimped thereby completing the manufacture of the flexible connector.

In accordance with another embodiment of the invention the end piece and the sleeve comprise an integral structure. A polymeric sleeve is received over the distal end of the corrugated tubing, and a length of mesh tubing is extended over the length of the corrugated tube and over the polymeric sleeve. The subassembly comprising the corrugated tube, the polymeric sleeve, and the mesh tubing is positioned within the sleeve and the sleeve is crimped to complete the assembly of the flexible connector.

In accordance with yet another embodiment of the invention the proximal end of the end piece comprises a sleeve. A quantity of polymeric material is received around the distal end of a length of corrugated tubing. The distal end of a length of corrugated tubing having the quantity of polymeric material received therearound is received in the sleeve of the end piece whereupon the sleeve is crimped thereby securing the corrugated tubing to the entities. For low pressure applications the construction of the flexible coupling is complete at this point. For high pressure applications a length of polymeric tubing, a length of mesh tubing and an outer sleeve are positioned around the crimped sleeve of the end piece. The outer sleeve is then crimped thereby securing the length of mesh tubing to the end piece.

In accordance with still another embodiment of the invention the proximal end of the end piece comprises a sleeve having an O-ring receiving groove formed in the interior surface thereof. An O-ring is received in one of the grooves defining the corrugations of a length of corrugated tubing and is also positioned in the groove formed in the interior surface of the sleeve. The sleeve is then crimped to secure the length of corrugated tubing to the end piece. For low pressure applications the construction of the flexible connector is completed at this point. For high pressure applications a length of polymeric tubing, a length of mesh tubing, and an outer sleeve are positioned in alignment with the sleeve of the end piece. The outer sleeve is then crimped to secure the length of mesh tubing in engagement with the end piece.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 2:
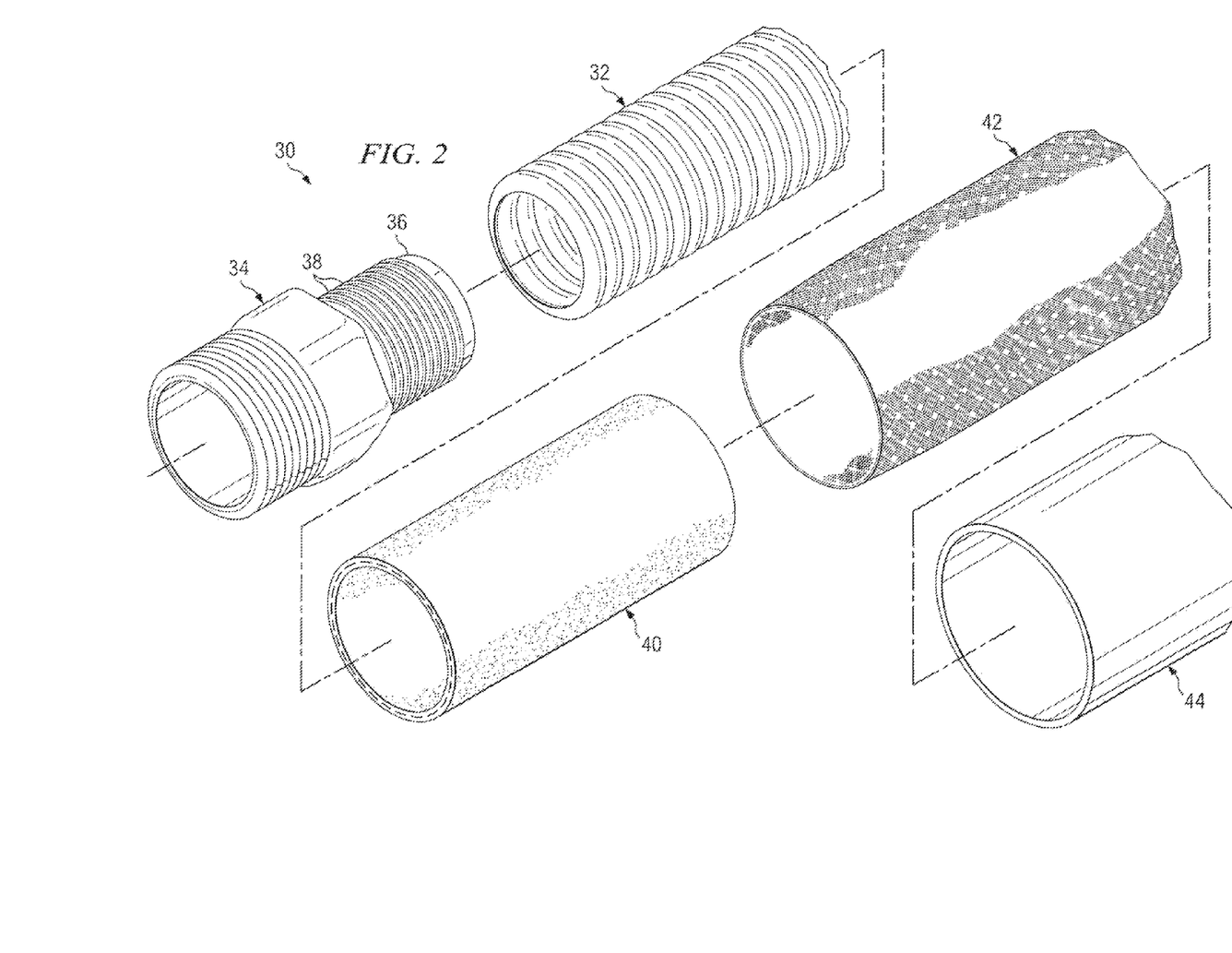
FIG. 2 is an exploded perspective view illustrating a flexible connector comprising a first embodiment of the present invention and further illustrating the initial steps in the manufacture thereof.
Figure 3:
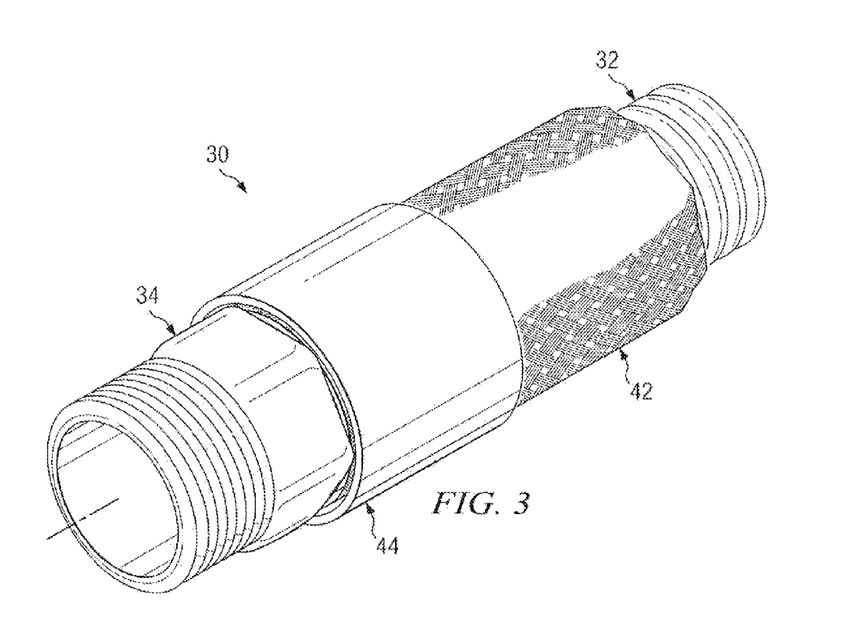
FIG. 3 is a perspective view illustrating the flexible connector of FIG. 2 following the completion of the manufacturing steps illustrated therein.
Figure 4:
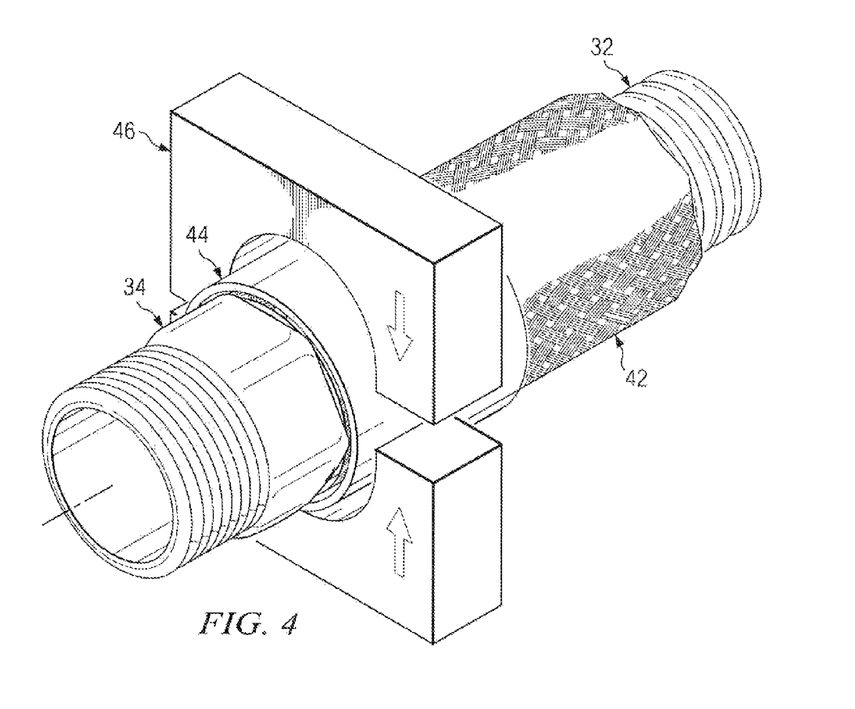
FIG. 4 is a perspective view illustrating final steps in the manufacture of the flexible connector of FIG. 2.

Referring now to the Drawings, and particularly to FIGS. 2, 3, and 4 thereof, there is shown a flexible connector 30 comprising a first embodiment of the invention. FIGS. 2, 3, and 4 further illustrate a method of manufacturing the flexible connector.

The flexible connector 30 includes a length of corrugated tubing 32 which extends substantially the entire length of the flexible connector 30. The length of corrugated tubing 32 may be formed from stainless steel, bronze, brass, carbon, monel, other metals, various polymeric materials, and other materials that will not be adversely affected by the fluid that will flow through the flexible connector 30. In most instances an end piece 34 is provided at each end of the length of corrugated tubing 32. Those skilled in the art will recognize the fact that the end piece 34 is representative only and that various types and kinds of end pieces can be utilized in the practice of the invention. The end piece 34 is provided with a proximal end 36 having a plurality of corrugations 38.

A length of flexible polymeric tubing 40 is initially extended over the exterior of the length of corrugated tubing 32 and is moved axially thereon sufficiently to expose the distal end thereof. Next, the proximal end 36 of the end piece 34 is engaged with the distal end of the length of corrugated tubing 32. Then, the length of flexible polymeric tubing 40 is moved axially along the length of corrugated tubing 32 until it moves into resilient gripping engagement with the corrugations 38 of the end piece 34. The function of the length of flexible polymeric tubing 40 is to initially retain the proximal end 36 of the end piece 34 in engagement with the distal end of the length of corrugated tubing 32.

After the polymeric flexible tubing 40 has been positioned to retain the proximal end 36 of the end piece 34 in engagement with the distal end of the length of corrugated tubing 32, a length of mesh tubing 42 is extended over the entire length of stainless steel corrugated tubing 32, and over the entire length of the flexible polymeric tubing 40, and over the corrugations 38 of the end piece 34. The length of mesh tubing 42 may be formed from stainless steel, KAYNAR®, nylon, various textiles, or other materials depending on the requirements of particular applications of the invention. Assuming that an end piece 34 is positioned at the opposite end of the length of corrugated tubing 32 and that the end piece 34 at the opposite end of the length of corrugated tubing 32 also has corrugation similar to the corrugations 38, the length of mesh tubing 42 also extends beyond the end of the length of corrugated tubing 32 and over the corrugations 38 of the end piece 34 positioned in engagement therewith.

Following the positioning of the length of mesh tubing 42 over the length of flexible polymeric tubing 40 and over the proximal end 36 of the end piece 34 and the distal end of the length of corrugated tubing 32, a sleeve 44 is positioned over the distal end of the length of mesh tubing 42 and in alignment with the length of flexible tubing 46. The results of the foregoing steps are illustrated in FIG. 3. The sleeve 44 may be formed from stainless steel, copper, bronze, brass, steel, or other materials depending on the requirements of particular applications of the invention.

Following the assembly steps described in the preceding paragraphs, the partially finished flexible connector 30 is positioned in a crimping die 46. Those skilled in the art will understand and appreciate the fact that the crimping die 46 is diagrammatically illustrated in FIG. 4, and that the actual crimping die will not necessarily have the appearance shown in FIG. 4. The function of the crimping die 46 is to crimp the sleeve 44 into permanent gripping engagement with the distal end of the length of mesh tubing 42, the length of flexible polymeric tubing 40, the corrugations 38 comprising the proximal end 36 of the end piece 34, and the corrugations 38 comprising the distal end of the length of corrugated tubing 32. The crimping of the sleeve 44 therefore permanently retains the proximal end 36 of the end piece 34 in engagement with the distal end of the corrugated tubing 32. Thus, following actuation of the crimping die 46 at the opposite ends thereof, the fabrication of the flexible connector 30 is complete.

In the case of flexible connectors intended for low pressure applications, the length of mesh tubing 42 can be omitted. In such instances the sleeve 44 is aligned with the length of flexible polymeric tubing 40, the corrugations 38 comprising the proximal end 36 of the end piece 34, and the corrugations 38 comprising the distal end of a length of corrugated tubing 32. The sleeve 44 is then crimped in the manner diagrammatically illustrated in FIG. 4 thereby permanently securing the component parts of the flexible connector in place.

Figures 5, 6:
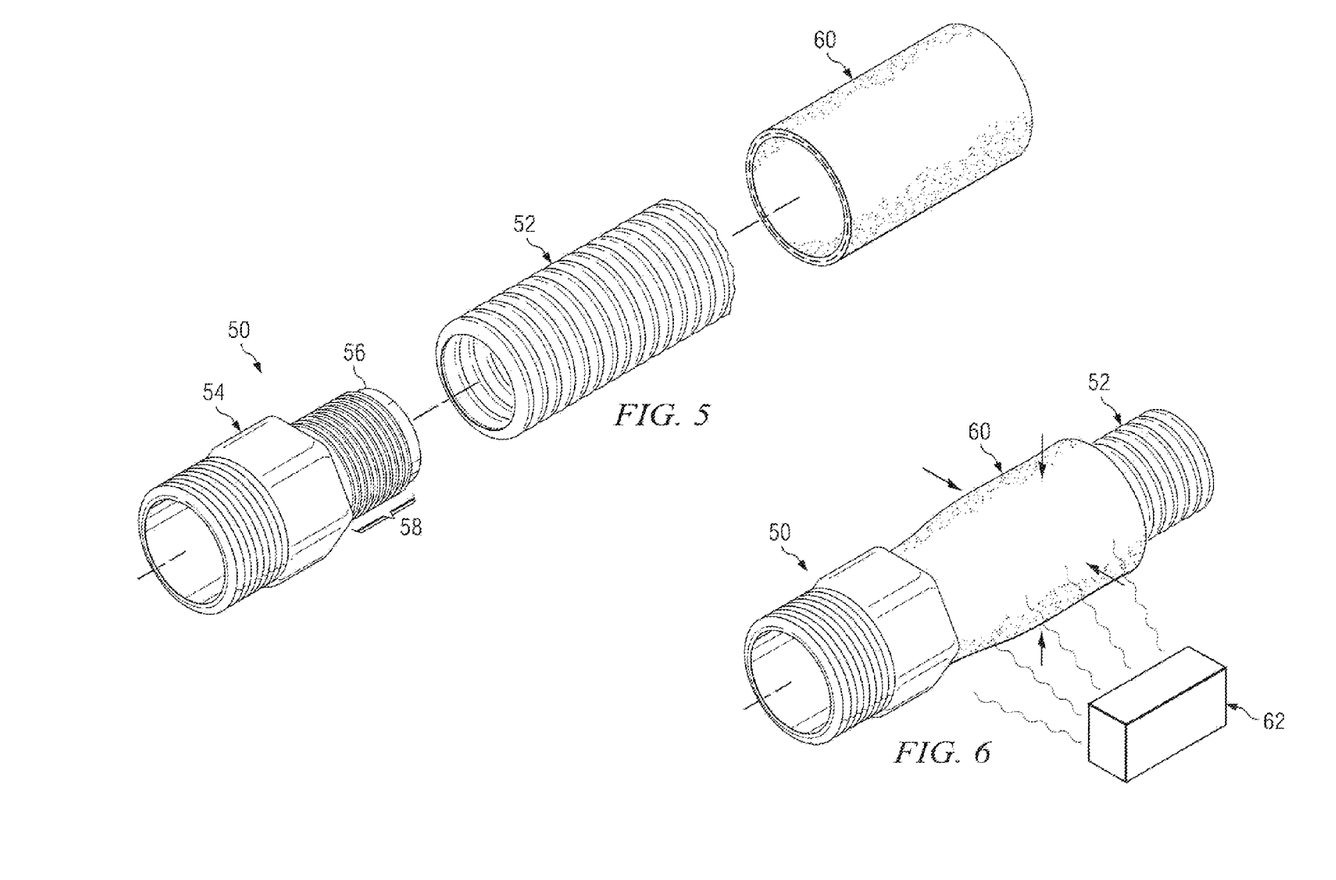
FIG. 5 is an exploded perspective view illustrating a flexible connector comprising a second embodiment of the present invention and further illustrating the initial steps in the manufacture thereof.
FIG. 6 is a perspective view illustrating subsequent steps in the manufacture of the flexible connector of FIG. 5.

Referring to FIGS. 5 and 6, there is shown a flexible connector 50 comprising a second embodiment of the present invention. The flexible connector 50 includes a length of corrugated tubing 52 which extends substantially the entire length of the flexible connector 50. The flexible connector 50 will typically include an end piece 54 positioned at each end of the length of corrugated tubing 52. Those skilled in the art will appreciate the fact that the end piece 54 is representative only and that various types and kinds of end pieces may be utilized in the practice of the invention.

Regardless of the type or kind of end piece that is utilized in the construction of the flexible connector 50, the end piece 54 is preferably provided with a proximal end 56 having a plurality of corrugations 58 formed thereon. An initial step in the manufacture of the flexible connector 50 comprises the engagement of the proximal end 56 of the end piece 54 with the distal end of length of corrugated tubing 52. Thereafter a length of heat shrink polymeric tubing 60 is moved axially along the length of corrugated tubing 52 until it extends over the corrugations 58 of the proximal end 56 of the end piece 54 and the corrugations 58 comprising the distal end of the length of stainless steel corrugated tubing 52.

Referring specifically to FIG. 6, after the length of heat shrink polymeric tubing 60 is positioned over the proximal end 56 of the end piece 54 and the distal end of the length of corrugated tubing 52, a radiation source 62 is utilized to heat the length of heat shrink polymeric tubing 60. Heating of the length of heat shrink polymeric tubing 60 causes the heat shrink polymeric tubing 60 to retract or shrink into rigid engagement with the distal end of the length of corrugated tubing 52 and the proximal end 56 of the end piece 54 thereby securing the distal end of the length of corrugated tubing 52 in engagement with the proximal end 56 of the end piece 54.

The succeeding steps in the manufacture of the flexible connector 50 are the same as the latter steps in the manufacture of the flexible connector 30 as illustrated in FIGS. 2, 3, and 4 and described hereinabove in conjunction therewith. Thus, the next step in the manufacture of the flexible connector 50 may involve extending a length of mesh tubing 42 along the entire length of corrugated tubing 52 and over the proximal ends 56 of the end pieces 54 comprising the flexible connector 50. Thereafter, a sleeve similar to the stainless steel sleeve 44 of FIGS. 2, 3, and 4 is positioned over the distal end of the length of corrugated tubing 52, the distal end of the length of mesh tubing 42 (if used), the proximal end 56 of the end piece 54, and the now-shrunk length of heat shrink polymeric tubing 60. The final step in the manufacture of the flexible connector 50 comprises the crimping of the sleeve 44 as illustrated in FIG. 4 and described hereinabove in conjunction therewith. In low pressure applications the length of mesh tubing 42 may be omitted.

Figure 7:
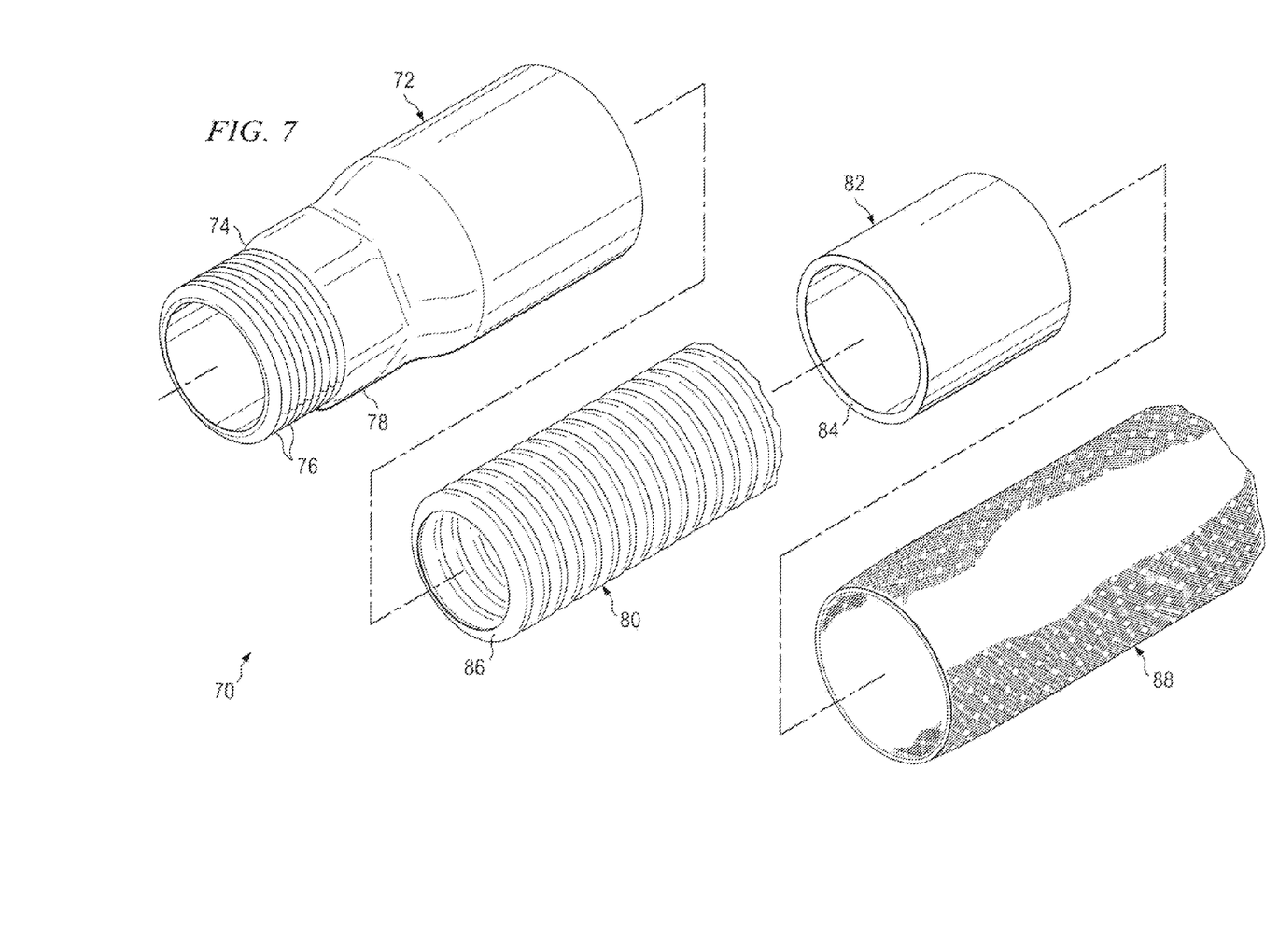
FIG. 7 is an exploded perspective view illustrating a flexible connector comprising a third embodiment of the invention and further illustrating the initial steps in the manufacture thereof.
Figure 8:
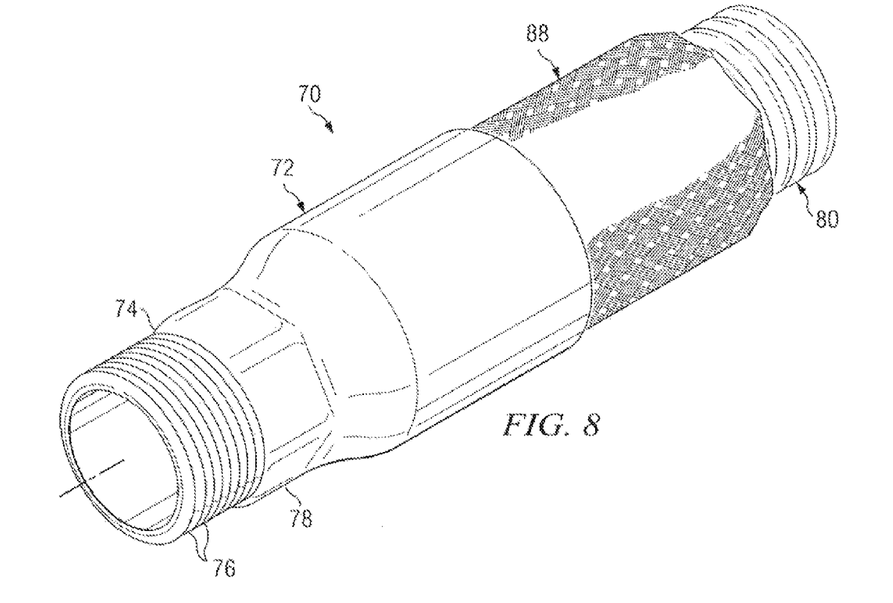
FIG. 8 is a perspective view illustrating the flexible connector of FIG. 7 following implementation of the manufacturing steps illustrated therein.
Figure 9:
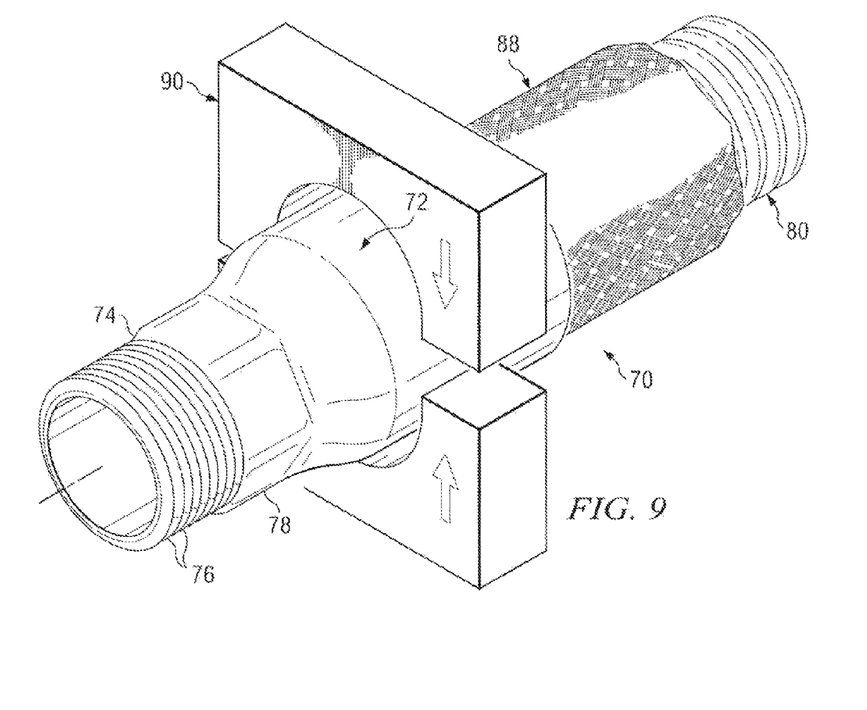
FIG. 9 is a perspective view illustrating final steps in the manufacture of the flexible connector of FIG. 7.

Referring to FIGS. 7, 8, and 9, inclusive, there is shown a flexible connector 70 comprising a third embodiment of the invention. The flexible connector 70 differs from the embodiment of the invention illustrated in FIGS. 2-4, inclusive, and described hereinabove in connection therewith in that the flexible connector 70 includes a sleeve 72 formed integrally with an end piece 74. The end piece 74 includes a connecting portion 76 which may be flanged as shown in FIG. 1B, or threaded, or grooved, or otherwise constructed depending upon the requirements of particular applications of the invention. The function of the connecting section is to secure the flexible connector 70 in engagement with an adjacent component which may comprise a pump, a nozzle, etc. The end piece 74 further includes a section 78 which may be hexagonal in shape or otherwise configured for mating engagement with a tool to facilitate engagement of the connecting portion 76 with the adjacent component.

A length of corrugated tubing 80 extends substantially the length of a flexible connector 70. A polymeric sleeve 82 is extended over the distal end of the length of corrugated tubing 80 with the end surface 84 of the polymeric sleeve 82 aligned with the end surface 86 of the length of corrugated tubing 80.

After the polymeric sleeve 82 is positioned in alignment with the distal end of the length of corrugated tubing 80, a length of mesh tubing 88 is extended over the entirety of the length of corrugated tubing 80 and over the polymeric sleeve 82. The subassembly comprising the length of corrugated tubing 80, the polymeric sleeve 82, and the length of mesh tubing 88 is then inserted into the end of the sleeve 72 remote from the end piece 74 and is fully seated in the sleeve 72. The result of the foregoing steps is illustrated in FIG. 8.

The next step in the manufacture of the flexible connector 70 comprises crimping the sleeve 72 into the permanent and retaining engagement with the subassembly comprising the length of corrugated tubing 80, the polymeric sleeve 82, and the length of mesh tubing 88. This is accomplished by positioning the partially finished flexible connector 70 in a crimping die 90. Those skilled in the art will understand and appreciate the fact that the crimping die 90 is diagrammatically illustrated in FIG. 9, and that the actual crimping die will not necessarily have the appearance shown in FIG. 9. The function of the crimping die 90 is to crimp the sleeve 72 into permanent gripping engagement with the distal end of the length of mesh tubing 88, the polymeric sleeve 82, and the length of corrugated tubing 80. Thus, following actuation of the crimping die 90 at the opposite ends thereof, the fabrication of the flexible connector 70 is complete.

Referring to FIGS. 10, 11, 12, 13, and 14, there is shown a flexible connector 100 comprising a fourth embodiment of the invention. FIGS. 10-14, inclusive, further illustrate a method of manufacturing the flexible connector 100.

Figure 10:
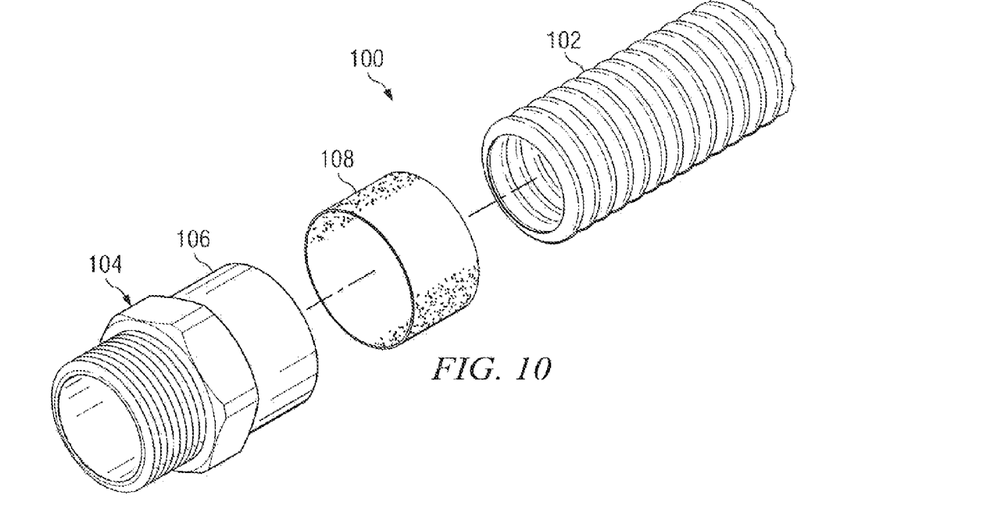
FIG. 10 is an exploded perspective view illustrating the component parts of a flexible connector comprising a fourth embodiment of the invention and further illustrating the initial steps in the manufacture thereof.

The flexible connector 100 includes a length of corrugated tubing 102 which extends substantially the entire length of the flexible connector 100. The length of corrugated tubing 102 may be formed from stainless steel, bronze, brass, carbon, metal, other metals, various polymeric materials, and other materials that will not be adversely affected by the fluid that will flow through the flexible connector 100. In most instances an end piece 104 is provided at each end of the length of corrugated tubing 102. Those skilled in the art will recognize the fact that the end piece 104 is representative only and that other types and kinds of end pieces can be utilized in the practice of the invention. The end piece 104 is provided with a proximal end 106 comprising a sleeve.

A layer of polymeric material 106 is initially secured around the exterior of the distal end of the length of corrugated tubing 102. The layer of polymeric material may be secured around the exterior of the distal end of the length of corrugated tubing 102 by spraying or otherwise applying polymeric material in liquid form to the exterior surface of the distal end of the length of corrugated tubing 102 and thereafter drying the polymeric material. Alternatively, the quantity of polymeric material 106 may comprise an elastic ring of polymeric material which is initially stretched sufficiently to facilitate the positioning of the distal end of the length of corrugated tubing 102 therewithin, and then allowing the ring elastomeric material to contract into engagement with the exterior surface of the distal end of the length of corrugated tubing 102. The quanand tity of polymeric material 106 preferably comprises a length of heat shrink polymeric material which is wrapped around the exterior of the distal end of the length of corrugated material 102 and thereafter heat shrunk into rigid engagement therewith. Other techniques for securing the quantity of polymeric material 106 around the exterior surface of the distal end of the length of corrugated tubing 102 will readily suggest themselves to those skilled in the art.

Figure 11:
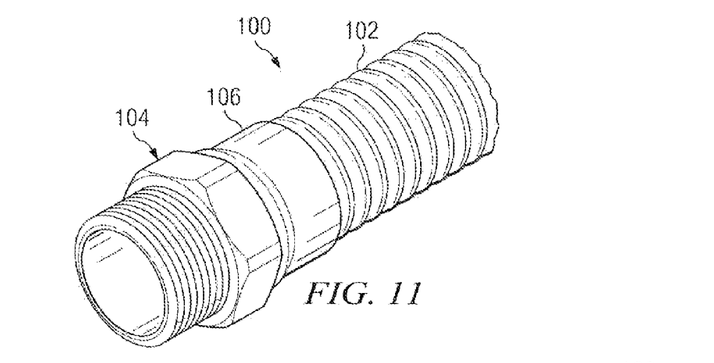
FIG. 11 is a perspective view illustrating the assembly of the component parts shown in FIG. 10.

After the quantity of elastomeric material 106 has been secured therearound the distal end of the length of corrugated tubing 102 is inserted into the sleeve 106 of the end piece 104. Thereafter the sleeve 106 of the end piece 104 is crimped into rigid retaining engagement with the distal end of the length of corrugated tubing 102 in a manner illustrated in FIG. 12. At this point the fabrication of the flexible connector 100 is complete insofar as low pressure applications thereof are concerned.

Figure 12:
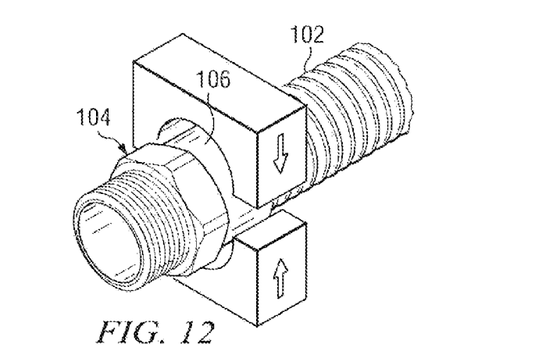
FIG. 12 is an illustration of the crimping of the assembled component parts shown in FIG. 11 to complete the construction of a low pressure flexible connector.
Figure 13:
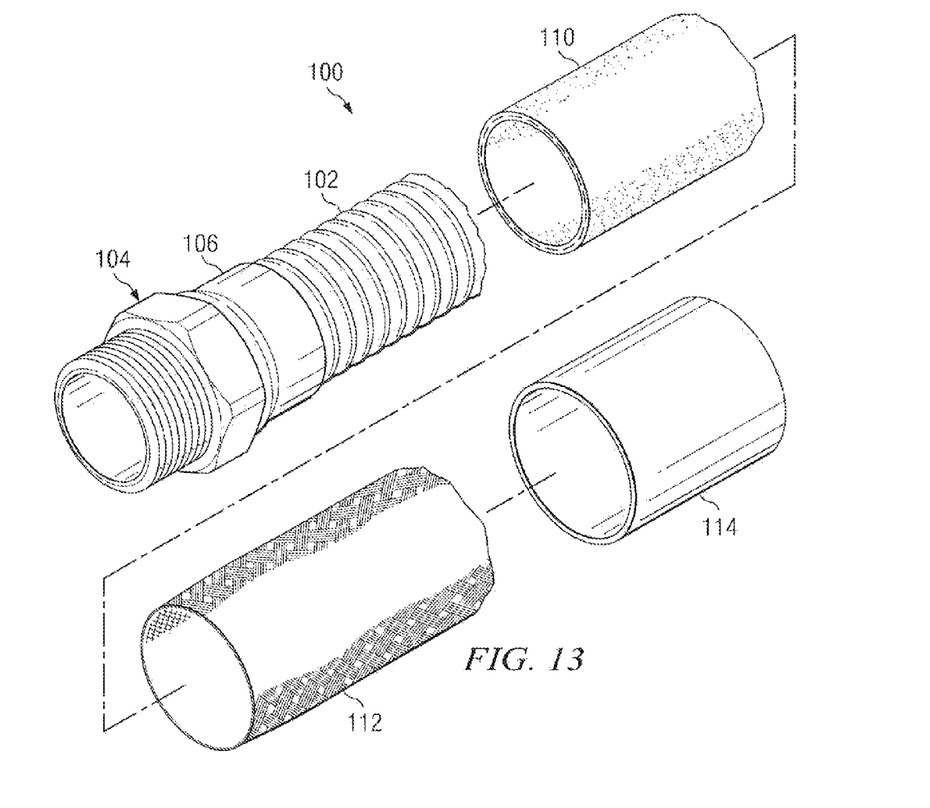
FIG. 13 is an exploded perspective view illustrating the component parts of a high pressure flexible connector comprising the fourth embodiment of the invention and further illustrating the initial steps in the manufacture thereof.
Figure 14:
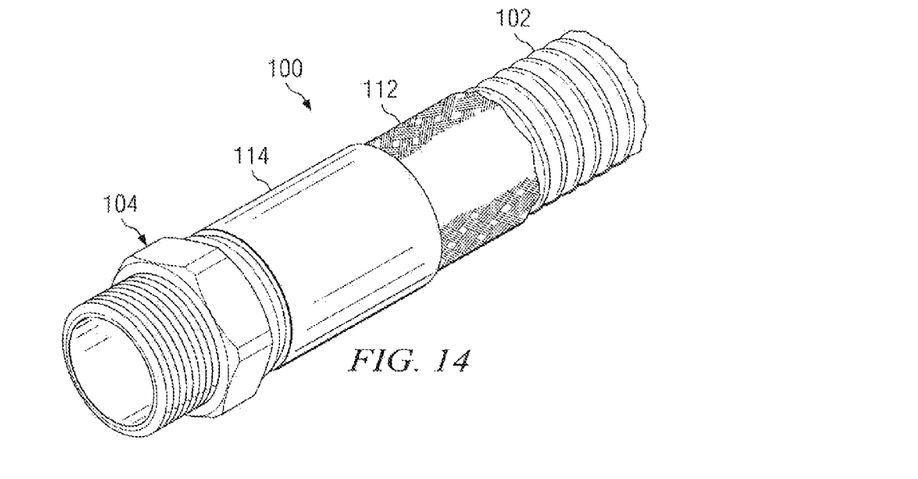
FIG. 14 is a perspective view illustrating the assembly of the component parts shown in FIG. 13.

FIGS. 13 and 14 illustrate additional steps in the fabrication of the flexible connector 100 whereby the flexible connector 100 is adapted for use in high pressure applications. After the sleeve 106 of the end piece 104 has been crimped into rigid retaining engagement with the length of corrugated tubing 102 in the manner indicated in FIG. 12 a length of polymeric tubing 110 is moved axially along the length of corrugated tubing 102 until the length of polymeric tubing 110 is positioned in engagement with the end piece 104 and in an overlying relationship with the sleeve 106. Thereafter a length of mesh tubing 112 is extended along the entire length of corrugated tubing 102. A sleeve 114 is then moved axially along the length of corrugated tubing 102 until it overlies the length of polymeric tubing 110 as indicated in FIG. 14.

The final step in the fabrication of the flexible connector 100 for use in high pressure applications comprises crimping of the sleeve 114 in the manner indicated in FIG. 4 and described hereinabove in conjunction therewith. At this point the construction of the flexible connector 100 for use in high pressure applications is complete.

FIGS. 15, 16, 17, and 18 illustrate a flexible connector 120 comprising the fifth embodiment of the invention. FIGS. 15-18, inclusive, further illustrate a method of manufacturing the flexible connector.

Figure 15:
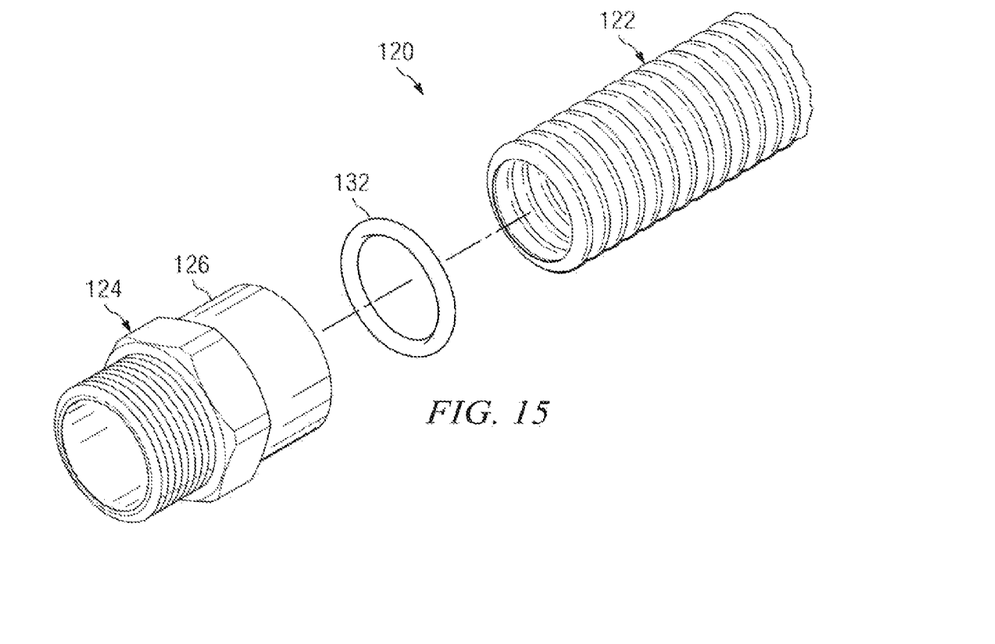
FIG. 15 is an exploded perspective view illustrating the component parts of a flexible connector comprising a fifth embodiment of the invention and further illustrating the initial steps in the manufacture thereof.
Figure 16:
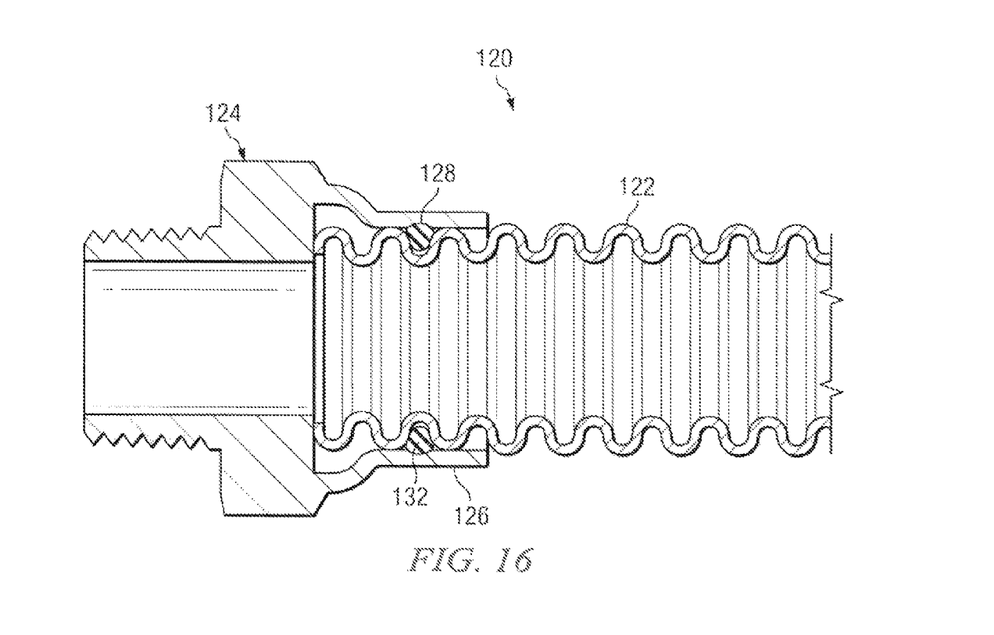
FIG. 16 is a sectional view illustrating the assembly of the component parts shown in FIG. 15.

The flexible connector 120 includes a length of corrugated tubing 122 which extends substantially the entire length of the flexible connector 120. The length of corrugated tubing 122 may be formed from stainless steel, bronze, brass, carbon, monel, other metals, various polymeric materials, and other materials that will not adversely affected by the fluid that will flow through the flexible connector 120. In most instances an end piece 104 is provided at each end of the length of corrugated tubing 122. Those skilled in the art will recognize the fact that the end piece 124 is representative only and that various types and kinds of end pieces may be utilized in the practice of the invention. The end piece 124 is provided with a proximal end 126 comprising a sleeve. Referring particularly to FIG. 16 an O-ring receiving groove is formed in the interior surface of the sleeve 126.

An O-ring 132 is received in the groove 128 formed in the interior surface of the sleeve 126. The O-ring 132 is also received in one of the corrugations comprising the corrugated tube 122. As illustrated in FIG. 16 the dimensions of the corrugated tube 122 and the sleeve 126 are coordinated such that one of the corrugations of the corrugated tube 122 aligns with the groove 128 having the O-ring 132 seated therein.

When the component parts of the flexible coupling 120 are positioned as illustrated in FIG. 16 the sleeve 126 is crimped in the manner illustrated in FIG. 12. At this point the fabrication of the flexible coupling 120 is complete insofar as low pressure applications thereof are concerned.

Figure 17:
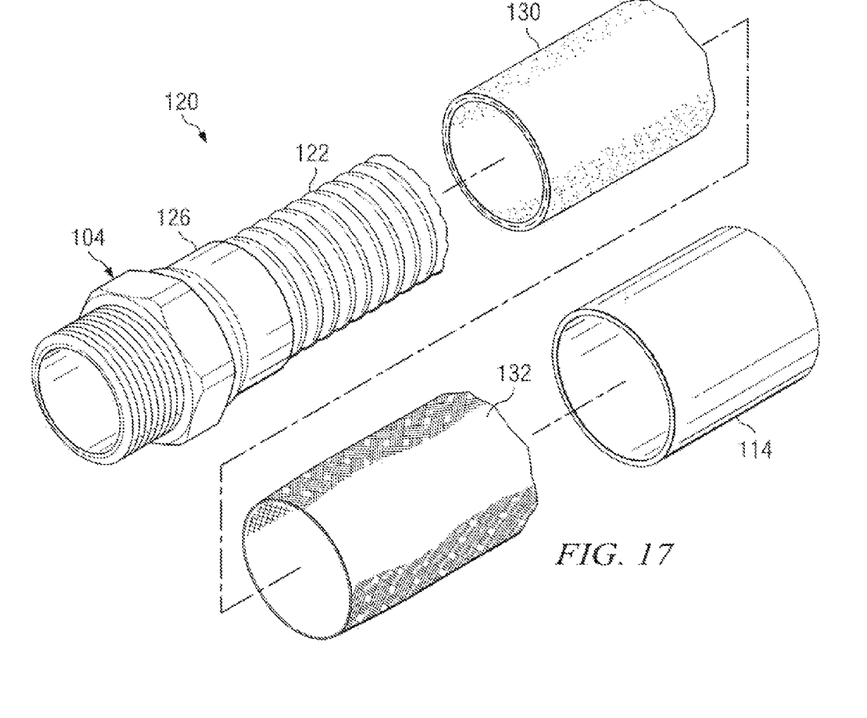
FIG. 17 is an exploded perspective view illustrating the component parts of a high pressure flexible connector comprising the fifth embodiment of the invention and further illustrating the initial steps in the manufacture thereof.
Figure 18:
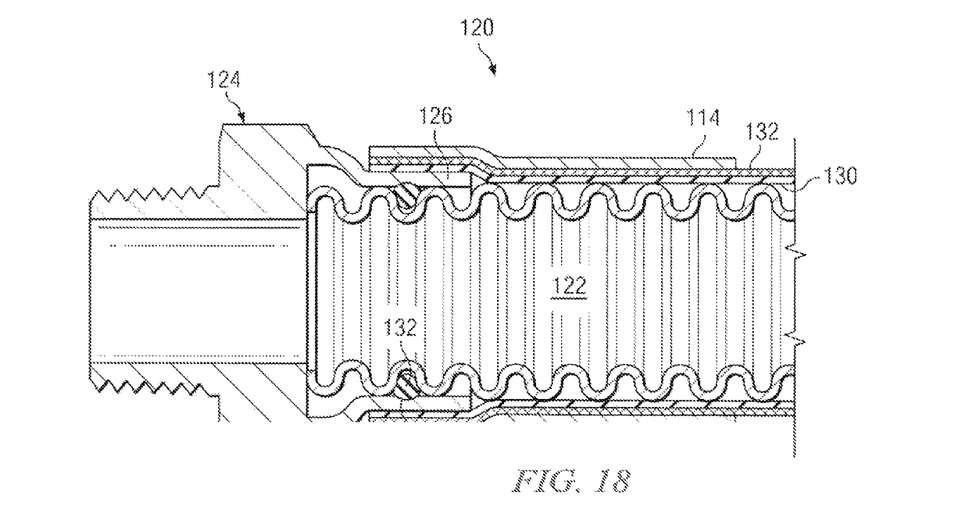
FIG. 18 is a sectional view illustrating the assembly of the component parts shown in FIG. 17.

FIGS. 17 and 18 illustrate additional steps in the fabrication of the flexible connector 120 whereby the flexible connector 120 is adapted for use in high pressure applications. After the sleeve 126 of the end piece 124 has been crimped into rigid retaining engagement with the length of corrugated tubing 122 in the manner indicated in FIG. 12 a length of polymeric tubing 130 is moved axially along the length of corrugated tubing 122 until the length of polymeric tubing 130 is positioned in engagement with the end piece 124 and in an overlying relationship with the sleeve 126. Thereafter a length of mesh tubing 142 is extended along the entire length of corrugated tubing 122. A sleeve 144 is then moved axially along the length of corrugated tubing 122 until it overlies the length of polymeric tubing 130 as indicated in FIG. 18.

The final step in the fabrication of the flexible connector 120 for use in high pressure applications comprises crimping of the sleeve 144 in the manner illustrated in FIG. 4 and described hereinabove in conjunction therewith. At this point the construction of the flexible connector 120 for use in high pressure applications is complete.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A method of manufacturing a flexible connector including the steps of:

provided a length of corrugated tubing comprising a plurality of grooves defining the corrugation thereof;

providing an end piece having a proximal end, the proximal end of the end piece comprising a sleeve;

the sleeve of the end piece comprising an interior surface having a circular groove formed therein;

providing an O-ring;

positioning the O-ring in one of the grooves of the length of corrugated tubing;

extending the distal end of the length of corrugated tubing into the sleeve and thereby positioning the O-ring in engagement with the circular groove formed in the interior surface sleeve;

providing a length of polymeric tubing;

positioning the length of polymeric tubing in a surrounding relationship with respect to the distal end of the length of corrugated tubing and the sleeve of the end piece;

providing a length of mesh tubing having a distal end;

positioning the length of mesh tubing in a surrounding relationship to the length of polymeric tubing and with the distal end thereof in alignment with the distal end of the length of corrugated tubing and with the sleeve of the end piece;

providing an outer sleeve;

positioning the outer sleeve in a surrounding relationship with the distal end of the length of mesh tubing; and thereafter crimping the sleeve of the end piece and thereby securing the length of corrugated tubing to the end piece.

2. The method of manufacturing a flexible connector according to claim 1 wherein the corrugated tubing is stainless steel.

3. The method of manufacturing a flexible connector according to claim 1 wherein the corrugated tubing is bronze.

4. The method of manufacturing a flexible connector according to claim 1 wherein the corrugated tubing is a polymeric material.

5. The method of manufacturing a flexible connector according to claim 1 wherein the polymeric tubing is flexible.

6. The method of manufacturing a flexible connector according to claim 1 wherein the mesh tubing is stainless steel.

7. The method of manufacturing a flexible connector according to claim 1 wherein the mesh tubing is nylon.

* * * * *